United States Patent [19]

Eickmann

[11] Patent Number: 4,987,650

[45] Date of Patent: Jan. 29, 1991

[54] RADIALLY FLEXIBLE SNAP RING

[76] Inventor: Karl Eickmann, 2420 Isshiki, Hayama-machi, Kanagawa-ken, Japan

[21] Appl. No.: 261,016

[22] Filed: Oct. 6, 1988

Related U.S. Application Data

[63] Continuation-in-part of Ser. No. 915,297, Oct. 3, 1986, abandoned, which is a continuation-in-part of Ser. No. 580,581, Feb. 21, 1984, abandoned, which is a continuation-in-part of Ser. No. 235,307, Feb. 17, 1981, abandoned.

[51] Int. Cl.$^5$ ............... B65D 63/00; F16B 21/18
[52] U.S. Cl. ............... 24/16 R; 24/20 S; 24/456; 411/353; 411/517
[58] Field of Search ........ 411/516, 517, 518, 520–522, 411/353; 24/16 R, 17 B, 20 R, 20 S, 456

[56] References Cited

U.S. PATENT DOCUMENTS

| | | | |
|---|---|---|---|
| 2,180,271 | 11/1939 | Arras | 24/456 |
| 2,793,414 | 5/1957 | Arras | 24/456 |
| 2,874,430 | 2/1959 | Coldren | 24/456 |
| 3,131,444 | 5/1964 | Manning | 24/27 |
| 3,213,499 | 10/1965 | Zylstra | 24/20 R |
| 4,242,775 | 1/1981 | Eickmann | 24/17 B |
| 4,305,179 | 12/1981 | Sakurada | 24/20 R |

FOREIGN PATENT DOCUMENTS

| | | | |
|---|---|---|---|
| 1365489 | 5/1964 | France | 411/520 |
| 1560606 | 2/1980 | United Kingdom | 24/20 R |

Primary Examiner—Neill R. Wilson

[57] ABSTRACT

This snap ring has outer and inner fingers which extend slightly from the ring. Thereby it becomes possible to embrace the ends of the fingers by a plier from the outside to press the ends of the fingers towards each other and thereby to widen the inner diameter of the snap ring in a limited extent for moving the ring over a respective bar. The inner face of the ring may be circular or of angular configuration. An accessory shows especially suitable pliers for the use of handling the snap ring.

The fingers extend normal to the imaginary medial plane of the ring, the outer face forms partially by a radius around an eccentric axis of the medial plane while the inner face of the ring may form by a radius around a concentric axis of the medial plane and the roots of the fingers should be bigger in radial direction than the length of the eccentricity between the concentric axis of the inner face and the eccentric axis of the outer face to give the snap ring the strength to hold itself against axial deplacement on a metallic bar or pipe.

20 Claims, 3 Drawing Sheets

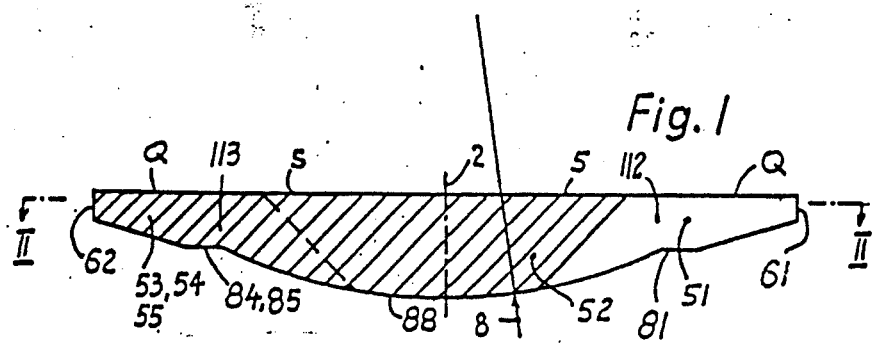
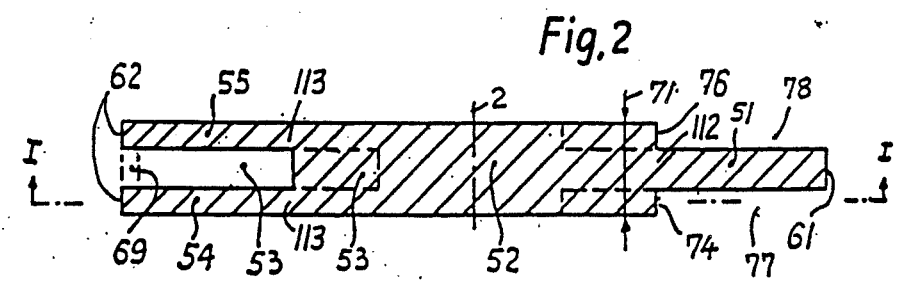
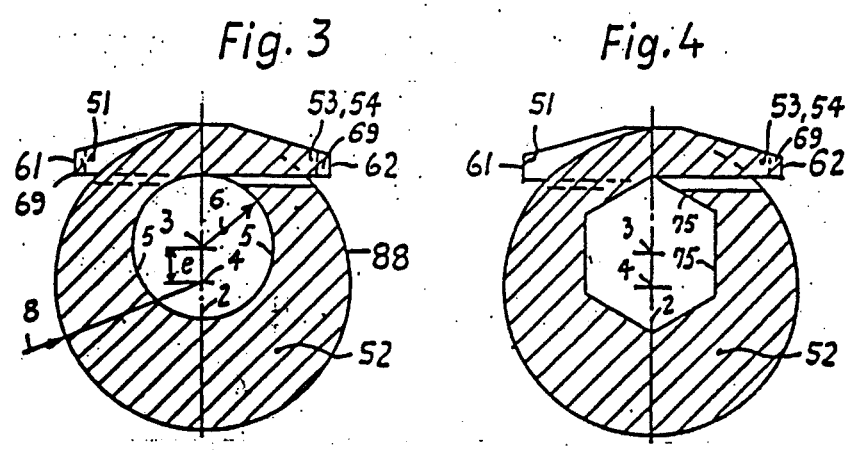
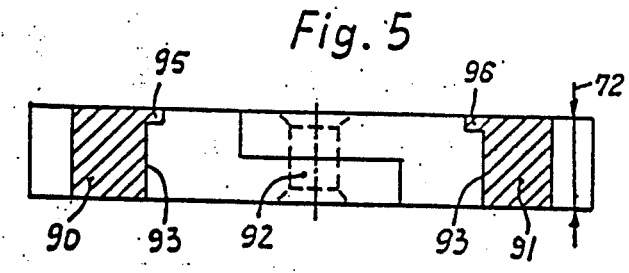
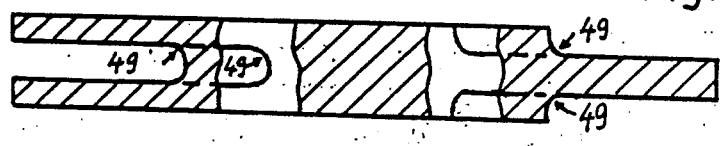
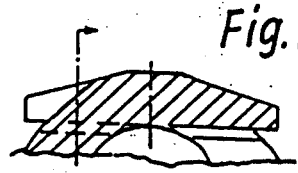

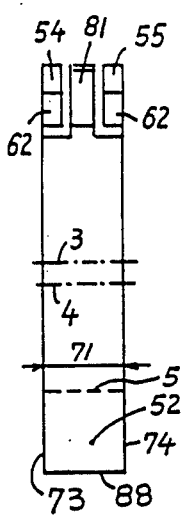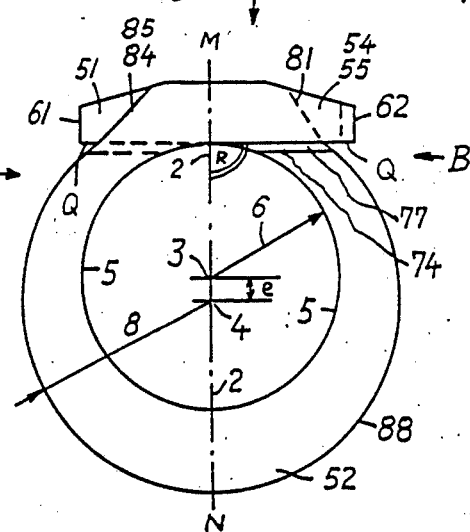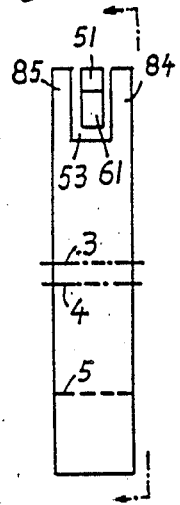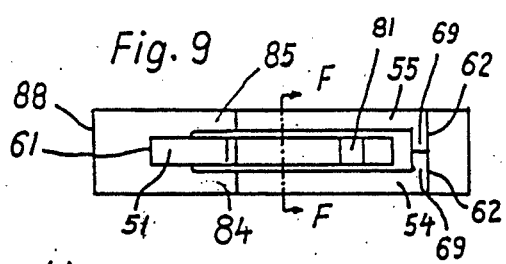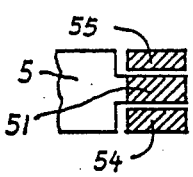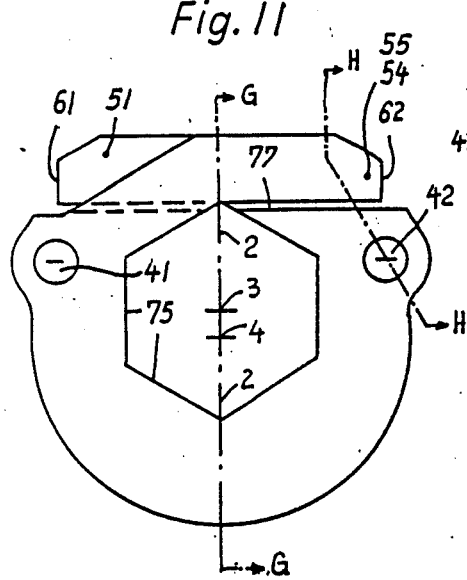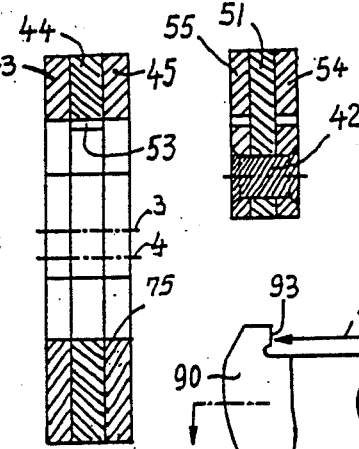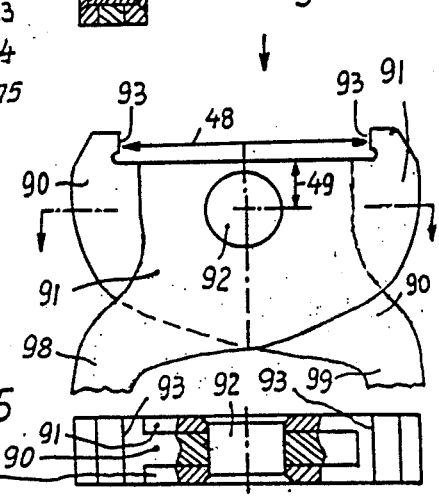

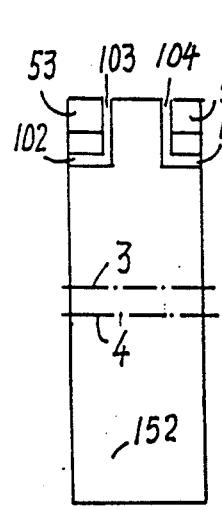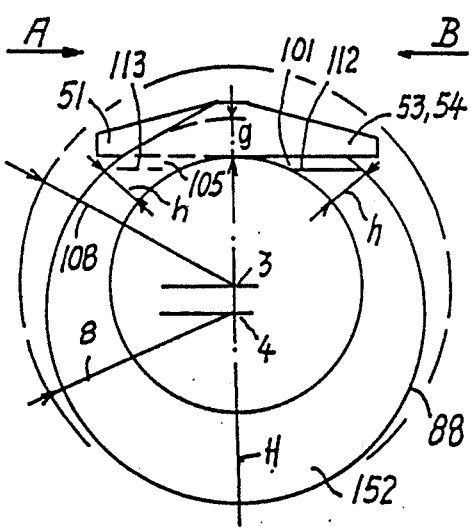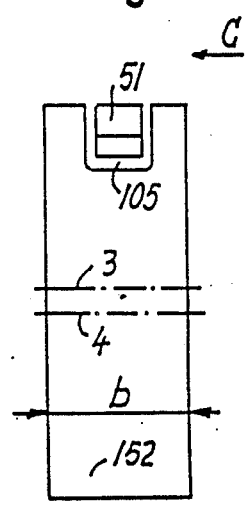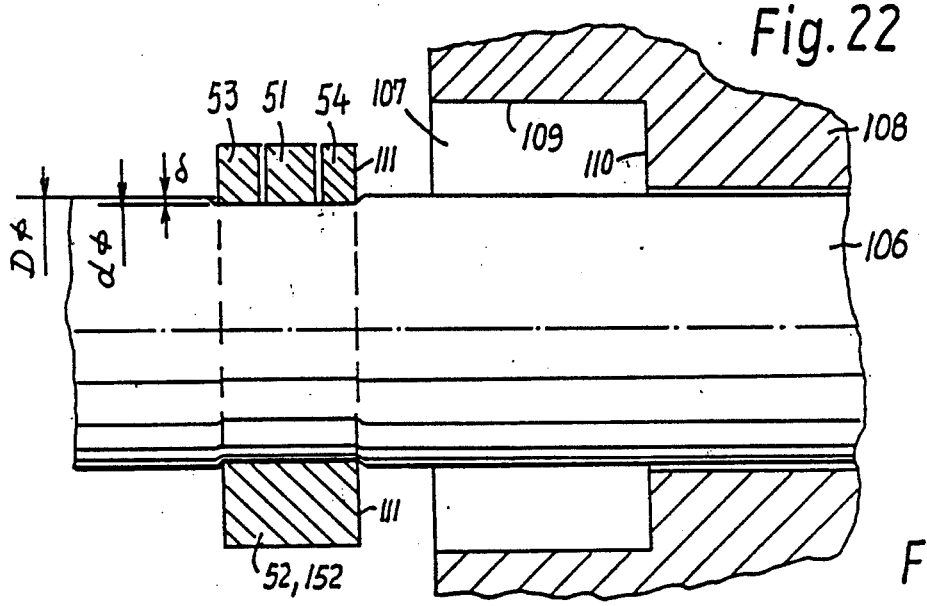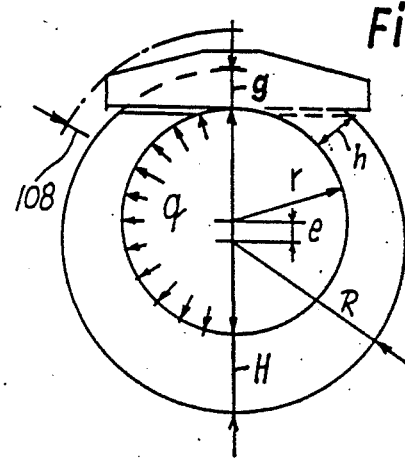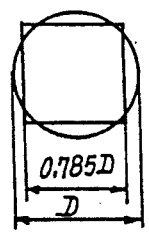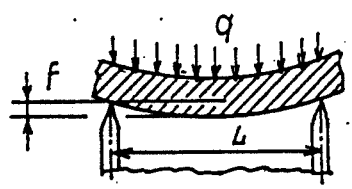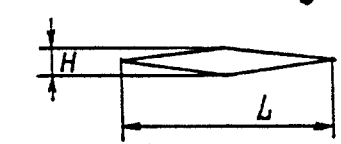

RADIALLY FLEXIBLE SNAP RING

REFERENCE TO RELATED APPLICATION

This is a continuation in part application of my at the filing date of this present application co-pending application Ser. No. 06-915,297, which was filed on Oct. 3, 1986 now abandoned which was a continuation in part of my now abandoned application Ser. No. 06-580,581, filed on Feb. 2, 1984. Application Ser. No. 580,581 was a continuation in part application of my still earlier application Ser. No. 06-235,307, filed Feb. 17, 1981, now abandoned and benefit of said application Ser. No. 235,307 and its filing date of Feb. 17, 1981 is claimed for this present application.

BACKGROUND OF THE INVENTION

1. Field of the Invention

The present invention relates to snap rings or spanning rings which are to be set onto a respective bar.

2. Description of the Prior Art

From the British patent No. 1,560,606 a fastening ring is known in which one finger extends through a slot between two fingers with the fingers extending radially away from the otherwise circular ring. By thrusting the fingers together the inner diameter of the ring will widen whereby the ring can be moved over a hose. By letting the fingers return to their original location under the inner stresses of the ring, the ring will fasten itself on the hose and the hose will thereby be kept on a pipe or another body.

A snap ring assembly formed by a plurality of single snap rings is disclosed in my earlier application, now U.S. Pat. No. 4,242,775. The assembly of the mentioned earlier snap ring assembly is simple in so far as the single rings can be easily stamped from sheets. However to assemble the single rings to an assembly requires drilling, setting tools, rivets or other means.

Common standardized snap rings of the prior art require annular grooves in shafts whereinto the snap rings are to be inserted. The insertion into a groove prevents axial delocation if a need arises to replace the snap ring in axial direction on the shaft.

The ring of the mentioned british patent is radially week and not able to fasten itself on a metallic bar strong enough to withstand axial thrust onto the axial end of the ring.

The snap ring assembly of my mentioned earlier patent requires pins in bores. These pins work satisfactory for a one time setting of the ring onto the respective shaft. For such applications, however, at which at different times different axial locations of the snap ring relative to the axis of the shaft are requird, the pins of the snap ring assembly weeken and prevent a many times axial re-setting of the ring assembly.

The former art thereby fails to provide a snap ring with the capability to fix itself strongly onto a shaft and to be able to carry an axially directed load without displacing itself on the shaft.

SUMMARY OF THE INVENTION

It is the main object of this present invention to provide a radially flexible snap ring with strong radial force which is capable of holding itself in a definte axial position relative to the axis of a shaft on the shaft. The aim of the invention is also to make the snapm ring so strong that it can carry an axially directed load without being inserted into a groove in the shaft and a further aim is to provide the snap ring with an ability for multiple expansion and compression in order to permit multiple re-setting onto a respective shaft while it is also an aim of the invention to produce the snap ring from a single piece of material and to produce it in an economic way.

Further aims and objects of the invention are, as follows:

It is an object of this invention to provide a radially flexible snap ring which is made of a single body and which can radially be widened by pressing the ends of its fingers towards each other. At the same time the fingers are strengthened.

According to other objects of the invention, the snap ring may either have a circular inner face or an inner face of angular configuration, for example a hectangular face.

It is also the aim, intention and object of this present invention to replace the assembly of several rings by a single body in order to spare the assembly work and other disadvantages of the snap ring assembly of my mentioned earlier application, which is now my mentioned U.S. Pat. No. 4,242,775.

A still further object of the invention is, to provide a plier with especially suitable faces to guide themselves on the mentioned fingers of the snap ring.

One of the main aims and objects of the invention is also to make the snap ring and the plier of rigid structure for highest clamping force of the snap ring on the respective bar and for the ability of the plier to widen and close the snap ring.

This aim and object shall be obtained by best comfortable handling of the pliers and of the snap rings.

In order to obtain the maximum of clamping and holding strength at smallest possible space consumption of the snap ring and at smallest possible manufacturing costs of the snap rings and of the pliers, certain rules of technologies and of provisions of details are supplied by the materialization of the aims and objects of the invention.

Such rules for obtaining the aims and objects of the invention are, for example, that the longitudinal extension of the fingers of the snap rings are directed substantially normal to the imaginary medial plane of the snap ring, that the centric and eccentric axes of the inner and outer faces of the snap ring have defined distances from each other, that the radii around the axes with which the inner and outer faces are formed have a certain ratio of the outer face radius to the radius of the inner face, and, that strengthened necks are provided on the rear portions of the fingers of the snap ring while the fingers have outer ends, which are subtantially parallel to the mentioned medial plane of the snap ring.

BRIEF DESCRIPTION OF THE DRAWING

FIG. 1 is a sectional view through a body taken along the line I—I of FIG. 2.

FIG. 2 is a sectional view through FIG. 1 along the line II—II.

FIG. 3 is a cross-sectional view through one embodiment of a snap ring of the invention taken through the front portion thereof.

FIG. 4 is a cross-sectional view through an other embodiment of a snap ring of the invention and also taken through the front portion thereof.

FIG. 5 is a cross-sectional view through a plier suitable for the handling of the snap ring of the invention or for the handling of snap ring assemblies of my earlier mentioned U.S. Pat. No. 4,242,775.

FIG. 6 is a view onto another snap ring of the invention.

FIG. 7 is a view from arrow B onto the ring of FIG. 6.

FIG. 8 is a view from arrow A onto the ring of FIG. 6.

FIG. 9 is a view from arrow E onto the ring of FIG. 6.

FIG. 10 is a sectional view along the arrowed line F—F of FIG. 9.

FIG. 11 is a view onto still another snap ring of the invention.

FIG. 12 is a sectional view along the arrowed line G—G of FIG. 11.

FIG. 13 is a sectional view along the arrowed line H—H of FIG. 11.

FIG. 14 is a view onto another sample of a plier of the invention.

FIG. 15 is partially a view from the arrow of FIG. 14 onto FIG. 14 and partially a sectional view along the arrowed line through FIG. 14.

FIG. 16 shows a modified member of FIG. 2.

FIG. 17 shows a portion of a snap ring of the invention,

FIG. 18 is a sectional view through FIG. 17 along the arrowed line of FIG. 17.

FIG. 19 is a view onto a snap ring along arrow C of FIG. 20.

FIG. 20 is a view onto FIG. 19 along the arrow A of FIG. 19.

FIG. 21 is a view onto FIG. 19 along the arrow B of FIG. 19.

FIG. 22 is a longituindal sectional view of an assembly, and;

FIGS. 23 to 26 are geometric explanations to a mathematic analysis.

DESCRIPTION OF THE PREFERRED EMBODIMENTS

In the Figures, the single body wherefrom the snap ring of the invention, may be formed, is shown in FIGS. 1 and 2. In these Figures the body is still a straight piece of material. In FIGS. 3 and 4, the other hand, the snap ring is fully formed.

The body has a medial portion 52 with therefrom extending fingers. The inner finger is seen by referential 51. The outer fingers 54 and 54 extend from body 52 in the opposite direction and between them the slot 53 is provided. Slot 53 is suitably dimensioned to receive therein a respective portion of the inner finger 51.

The still straight bodies of FIGS. 1 and 2 may become bent in such a way that they bent upwards around and the inner finger 51 enters partially into and through the slot 53 between the outer fingers 54 and 55. When that is done, the body of FIGS. 1 and 2 has formed the snap ring of FIG. 3 or that of FIG. 4.

The body 52 should be basically symmetric about the medial plane 2 except the difference of the inner and outer fingers. The upper face 5 may form later, after the bending, the inner face 5 of the snap ring of FIG. 3.

FIG. 6 shows a snap ring which is substantially similar to that of FIG. 3. The view onto the ring of FIG. 6 is taken from the arrowed line of FIG. 8 along the direction of the arrows thereof. There is not much basic difference between the snap ring of FIG. 3 and that the snap ring of FIG. 6. The ring of FIG. 6 is in scale one of the snap rings which were tried out when the present invention was made. In FIG. 6 are, however, more details demonstrated than in FIG. 3, because FIG. 6 has the thereto belonging views or sections of FIGS. 7 to 10.

Since most of the details in FIGS. 3 and 6 are similar and the most of the referential numbers are equal in both Figures, in the following only FIG. 3 will be described whereby it should be understood, when FIG. 3 is mentioned, that the description also belongs to FIG. 6 and the thereto belonging viewing FIGS. 7 to 10. Only when FIGS. 6 to 10 show specifics those will be discussed at hand of FIGS. 6 to 10.

Body 52 of FIGS. 1 and 3 or the bodies 52 of FIGS. 3 and 4 have a medial outwardly extending strengthening portion 52 which later forms the outer face 8 of the snap ring.

The fingers 51, 54, 55 extend from their roots 112, 113 on the ring towards their reception faces 61, 62 for the reception of a plier or tool.

The fingers may be provided with bent portions 69 which may normally extend from the fingers 51, 54 or 55 or from ends 61 or 62. This would be convinient also to close the slot 53 on its end and weld or bind the outer fingers 54 und 55 together to strengthen them.

In any case, however, the fingers 51, 54 and 55 have outer ends 61 or 62. These ends are important and they should extend rectangularly, meaning normal to the fingers, in order, that the pliers can hold them and press them together when the snap ring of FIGS. 3 or 4 is actually formed.

Returning now to FIGS. 3 and 4, it will be seen, that the snap ring has a medial imaginary plane 2 with the centric axis 3 normal to the plane of the ring which may form the medial axis of inner face 5 of the ring of FIG. 3 or of the angular inner face 75 of the ring of FIG. 4. When the ring has the strengthening medial portion 52 the outer face 88 of the medial portion and of the ring is shown by radius 8 and outer face 88 around the eccentric axis 4. The axis 4 is distanced from the medial axis 3 within the medial imaginary plane 2. The inner face 5 of FIG. 3 is formed by radius 6 around the medial axis 3.

The ring of FIG. 3 is suitable for setting onto a round bar, while the ring of FIG. 4 is suitable for setting onto angular outer faces of angular outer face bars, for example, onto rectangular bars, square bars or hexagon bares, depending on the configuration of the inner face 75 of FIG. 4.

In FIG. 5 a tool for the handling of the snap ring of FIGS. 3 and 4 is shown in a cross-sectional view. It should be understood that specific pliers, if they are of suitable size and strength, would be satisfactory to open the snap ring of FIGS. 3 and 4 by pressing the ends 61 and 62 towards each other and to close the respective snap ring by opening the pliers and let the ends 61 and 62 of the fingers 51 and 54, 55 move away from each other again. Thereby the respective inner face 5 or 75 of the respective snap ring of FIGS. 3 or 4 would radially widen and close, or be narrowing, again. By the automatic closing under the spring action of the strength of the snap ring's body 52, the respective snap ring of FIGS. 3 or 4 will fasten itself on the respective bar, whereonto it is set.

In the tool or plier of FIG. 5 the pin 92 holds the two plier arms together as in a conventional plier and it forms the arms 90 and 91. In order to be especially convinient for the handling of the snap ring of the invention, the arms 93 get a width 72 which corresponds to that of the breadth 71 of the snap ring of FIGS. 3 and 4. The holding portions 95 and 96 may be provided and be extended inwardly from the respective axial ends of the plier-arms 91 and 91 in order to prevent an axial escape of the fingers or ends 51, 64, 54, 61, 61 of the snap ring of FIGS. 3 or 4 from the seats 93 of the tool or plier.

The practical features of the snap rings of the invention are, that they can be of extreme radial strength and fastening power, that they can be handled exclusively radially of the snap ring in narrow spaces radially of the respective bar whereonto they are set, and, that they can be used without the presence and need of circular grooves in the respective bar or pipe. The heretofore common circular grooves in bars and pipes, whereonto snap rings were set and which had to be specifically machined, can be spared, while at the same time, the snap ring of the invention is capable of any axial setting. Any suitable axial location along the axis of the respective bar can be set and fixed by the snap ring of the invention.

While FIGS. 1 and 2 show and demonstrate, how the snap ring might be produced out of a body of metal, it should be understood, that the snap ring may also be made directly to FIGS. 3 or 4 without using the manufacturing procedure of FIGS. 1 and 2. For exaple, narrow slots may be milled or sawed from top into FIGS. 3 and 4. Thereby the fingers 51 and 54, 55, would be obtained. The dotted lined or non-dotted spaces in FIGS. 3 and 4 which extend in these Figures normally to the imaginary medial plane 2 can be drilled or cut by mill or endmill into the one-piece bodies of FIGS. 3 and 4, whereby the radial moveability of the fingers 51 relatively to fingers 54 and 55 would be obtained. The snap ring would then be perfect and be that of FIGS. 3 or 4 without the machining procedure of FIGS. 1 and 2.

When the snap ring of FIGS. 3 or 4 would be made out of plastic or, for example, out of strong carbon fiber, the forms for pressing the snap ring of FIGS. 3 or 4 might get small portions to form the narrow spaces along or below the fingers 51, 54 and 54 of the rings of FIGS. 3 or 4. It is seen by these examples, that the ring of the invention can be manufactured in different ways and still obtain the snap ring and the aim of the invention.

The ring of FIG. 4 may also be used for an angular fixing on faced or cornered bars. It is then possible to provide extensions on the fingers or ends 51, 54, 55, 61 or 62, whereby such extensions could then, for example, be used, to turn the respective bar, whereon the ring is set, around its axis.

The ring of the invention is therefore not only suitable for industrial applications but also for toys for children. They can mount bodies on bars therewith at desired axially different locations and even turn the bars and means which are assembled to the respective bar.

FIG. 4 shows again a snap ring. This snap ring corresponds substantially to that of FIG. 3. The snap ring of FIG. 6 is one, which was one of the earliest samples of the snap ring of the invention. In order to see all the details better, the FIGS. 7 to 10 show respective views or sections of the snap ring of FIG. 6. FIG. 6 is a look onto the snap ring as seen from the arrowed line of FIG. 8. The views from the arrows A and B of FIG. 6 give the FIGS. 7 and 8, whereby the top portions of FIGS. 7 and 8 demonstrate how the respective fingers and slots are seen, when looked against them from the mentioned arrows of FIG. 6. The outer look of the snap ring of FIG. 6 is still better seen, when the view along the arrow E of FIG. 6 brings about the bottom FIG. 9. The sectional view through FIG. 9 along the arrowed line F—F gives the FIG. 10, wherein the location of finger 51 relative to the fingers 54 and 55 is seen.

FIG. 11 shows a snap ring which corresponds substantially in this view onto the snap ring to that of FIG. 4. However, the ring of FIG. 11 is not made from a single piece body, but from three individual plates. That is shown in FIGS. 12 and 13. FIG. 12 is the sectional view through FIG. 11 along the arrowed line G—G of FIG. 11, while FIG. 13 is the sectional view through FIG. 11 along the arrowed line H—H of FIG. 11. The feature of FIGS. 11 to 13 is, that the medial plate 44 can be slightly bigger than the outer plates 43 and 45. Thereby a problem of my U.S. Pat. No. 4,242,775 has been overcome or the respective snap ring has been improved. In the mentioned snap ring of my mentioned patent the inner plates and outer plates were of equal thickness. Thereby the outer fingers have become weeker than the closer be-supporting inner fingers. By clamping with clamps 42 the three ring plates of FIGS. 11 to 13 together, the medial plate 44 can get a thickness which makes the medial finger 51 of plate 44 of equal strength to the outer fingers 54 and 55 of the outer plates 43 and 45. What never had been seen before, but what is most important, according to the present invention, is, that the fingers must be strong enough to resists deflection of the fingers under the heavy forces of the pliers. In the snap rings of my mentioned patent, the outer fingers tended to deflect outwards, away from the medial fingers under the heavy thrust of the bites of the pliers. This problem is overcome by the present FIGS. 11 to 13. Since each outer finger 54 and 55 of FIG. 13 is laterally weeker against deformation, than the medial finger 51 of the Figure, the combined lateral resistance against lateral deformation is applied in these Figures to obtain equal lateral strengthes in the sum of the outer fingers relative to the lateral strength of the inner finger. The overall strength of the snap ring assembly is thereby improved relative to the snap ring of my mentioned U.S. patent, because the thickness of the medial finger 51 is now smaller than the sum of the thickness of the inner fingers of my mentioned patent. Thereby the relative thickness of the outer fingers becomes bigger than at a snap ring of the thickness of the prior art. Such thicker outer fingers give the respective bigger lateral strength and capability to resist lateral deformations.

Since it is the aim of the invention to eliminate the need of grooves in bars for obtaining resistance against lateral movement of the snap ring on a bar and thereby to reduce the costs of mounting a strongly laterally keeping snap ring on a respective bar, the radial strength of the snap ring of the invention must be much bigger than the radial strength of the common snap ring. Because in the common snap ring the wall faces of the groove of the bar keep the snap ring in place on the bar in the direction of the axis of the bar. Also in hose clamps, for example for hoses of water or of gas or air, the pipe ends, whereonto the hoses are set, are commonly provided with annular depressions or grooves with radially wider bords on the ends thereof in order to mak a slip of the fastening snap ring in the direction of the axis of the pipe-end impossible. In common snap rings and hose clamp rings the axial holding strength depends more on the presence of a groove or depression in the bar or pipe end with respective radially outwardly extending bords on the ends of the grooves or depressions. The common snap rings and hose clamps thereby do not need very big radial strengthes. But the snap rings of the present invention require very strong radial strength, because they shall eliminate the need of radially inwardly lathed grooves or radially inwardly cast or pressed depressions of bars or pipe ends. They shall keep themselfes axially seen in correct position on the outer face of the bar or hose by own radially inwardly directed clamping force, which is a function of the radial strength of the snap ring.

In order to secure the so required radial strength and clamping force of the snap ring of the invention, certain geometric-mathematic rules should be obeyed. This will be understood from the Figures. For example, the relationship of the lengths of the radii 6 and 8 of the Figures as well as the distance of the centric axis 3 from the eccentric axis 4, or the distance of the eccentric axis 4 from the centric axis 3 are of great importance to the radial strength of the snap ring. To see this better, certain relationships are now defined and they will be called: "ratio". One such ratio is the relation of diameter 8 to diameter 6. Another ratio is the ratio of the eccentricity "e" between the eccentric and centric axes 3 and 4 to the inner diameter 6. See hereto FIGS. 3 and 6.

The radial strength alone would not make much sense, if the fingers and pliers would not be strong enough to handle the widening of the inner diameter of the snap ring for the movement over the outer face of the respective shaft, bar or pipe. Therefore, also the fingers have to be made with the best strength. In order to obtain the strength of the fingers in radial and lateral direction within a small space, some more ratios are of value. For example, a third ratio is the thickness of the medial finger 51 relative to the thickness of one of the outer fingers 54 or 55. And, a fourth ratio is the distance between the ends 61 and 62 relative to the biggest outer diameter=2 times radius 8 of the snap ring. A fifth ratio is the ratio of the radial size of the fingers in the medial plane of the snap ring relative to the inner radius 6 of the snap ring.

The most perfect ratios to obtain a most perfect snap ring are still under empiric development. However, it has already been found that certain rules should be obeyed for the ratios. Those are, for example;

(a) The first ratio, the ratio of the outer radius 8 to the inner radius 6 should be bigger than 1.1. This ratio may occasionally be as big as 1.5 or even bigger.

(b) The second ratio, the ratio of the eccentricity "e" between the eccentric and centric axes 4 and 3 relative to the inner radius 6 should be between 0.10 and 0.35. Commonly it is about 0.15 to 0.25.

(c) The third ratio, the ratio of the thickness of the medial or inner finger 51 relative to the thickness of a single outer finger 54 or 55 should be between 1.1 and 1.9. Commonly it is about 1.35 plus/minus 0.2.

(d) The fourth ratio, the ratio of the distance between the ends 61 and 62 of the fingers relative to the biggest diameter of the snap ring which is 2 times of the outer radius 8 should be about 0.8±0.18.

And, (e) the fifth ratio, the ratio of the radial size of the fingers 51, 54, 55 at the location of the medial plane 2 of the snap ring relative to the inner radius 6 of the snap ring should be about 0.4 to 0.9, or, at least the roots of the fingers should be radially bigger than the distance between the centric and eccentric axes.

The actual ratios should be defined individually for every size of the snap ring, depending thereon, what strength the snap ring shall have, especially what clamping force the snap ring shall supply in what size of space around the respective shaft, bar or pipe.

A further important matter is, to give to the roots of the fingers of the snap ring a bigger radial strength than was there in my mentioned U.S. patent. This is shown by the necks 81 and 84 to 85. These necks are the radial strengthening and widening of the roots of the fingers 51 and 54 to 55. It is seen in FIGS. 1 and 6 to 9. If these radial widenings which are now called necks are not applied, the roots of the fingers tend to deform under the heavy thrust of the bite of the plier(s).

Further strength is obtained for the snap ring, when the outer offcuts 77, 78 see FIG. 2—and the inner outcut or groove 53 get radii or roundings 49 on their roots. See hereto FIGS. 16 to 18. FIGS. 16 to 18 show portions of the snap ring of FIGS. 1 to 3 with strengthening of the snap ring by the application of radii or rounded corners 49 to the roots of the off cuts and out cuts 53 and 77 to 78.

Most important for obtaining a great radial clamping strength, and comfortable handling of the snap ring of the invention in the smallest possible space around the bar, pipe or shaft whereonto the snap ring shall be set, is shown in FIGS. 3, 4, 6, 11 and 16, but explained specifically in FIG. 6. FIG. 6 shows in its top portion the letter "R" inside of two quarter circles. This shall show, that the direction of the bottoms of the fingers which are shown by "Q" in FIG. 6 shall be substantially normal, meaning 90 degrees, relative to the imaginary medial plane 2 of the snap ring. The medial plane 2 is for a better understanding shown in FIG. 6 as going from the top "M" to the bottom "N" of the snap ring. Thus, the fingers 51 and 54 to 55 of the snap ring are to be directed substantially normal, rectangularly respective to the medial plane 2 of the snap ring. If this rule is not obeyed, for example, if the fingers extend substantially radially from the ring, they would deflect, bent, bow, under the heavy thrust force of the bites of the plier(s).

FIGS. 14 and 15 explain more details of the preferred pliers. Commonly the strong snap ring of the invention can not be opened by the force of the human finger as, for example, hose clamps, may be opened. A comfortable tool to widen the inner diameter or the inner face or faces of the snap ring and to let the snap ring narrow and clamp again, is therefore very much desired. The tool or plier(s) of FIGS. 14 and 15 has two portions which are riveted or kept together by rivet or holder 92. On the inner ends the portions form the bites or clamp faces or holding faces 93. One face 93 on portion 90 and another holding face 93 on portion 91. The holding faces 93 are substantially parallel to each other and thereby able to meet the to each other parallel end faces 61 and 62 of the snap ring. The distance 48 between the holding faces of the tool o plier(s) is in the opened position of the tool or plier(s) slighty wider than the distance between the ends 61 and 62 of the snap ring. The rear ends of the portions of the tool or plier(s) form the tool arms 98 and 99. They are commonly rather long, in order to excert a great force by the human hand comfortable to the tool or plier(s). Note here, that the inner end of portion 90 is on the left in FIG. 14 while the rear arm 90 is on the right half of the Figure. Similarly the inner end of portion 91 is on the right side of FIG. 14, while the rear arm 98 of portion 91 is on the left half of FIG. 14. That is a crossing over the medial plane of the tool or plier(s) in order to have the bites or holding faces 93 move towards each other for forcing the outer ends 61 and 62 of the snap ring towards each other, when the human hand presses the rear arms 98 and 99 of the tool or plier(s) towards each other. While the rear arms 98 and 99 of the tool or plier(s) are rather long in order to make the comfortable handling by the hand of a person possible or even to obtain a rather long arm of torque, the distance of the bites or holding faces 93 from the axis of the rivet or holder 92 should be rather short. That is defined by the referential 49 in FIG. 14. As bigger the ratio 48 to 49 of the tool or plier(s) of FIGS. 14 and 15 is, as stronger the force of the tool to widen the inner diameter or inner faces of the snap ring will become.

Finally, a further feature of the snap ring of the invention is, that it can also be set for axial fixings onto such long bars, shafts or pipes, which are too long to be set into a lathe machine for lathing an inwardly extending groove with radially extending bords into the respective bar, shaft or pipe.

In FIGS. 19 to 21 the snap ring is formed out of a single piece of material. The ring has generally the same configuration and function as in the other Figures of the present application. Those referential numbers which are already known from the earlier Figures of this present patent application will, therefore, not be repeated in FIGS. 19 to 21. All three Figures show the same ring, however, from different directions as indicated by the arrows A to C. Each Figure shows the ring seen from the outside in the direction of the respective arrow onto the ring.

In this ring the inner and outer faces 5, 75 and 88 are formed on this ring 152. The fingers 51 and 53, 54 are shown in the Figures.

As the speciality of this ring the slots 101 to 105 are formed into the one piece material of the ring. If the ring is made out of spring steel, these slots are cut by respective milling cutters or end mills. If the ring is cast, for example, of plastic or fiber reinforced plastic, the slots are formed by the respective dices or Jigs.

On this ring as well as on the rings of the other Figures of this patent application the fingers should remain inside of the radius 8 if such radius is now defined by referential number 108 and set around the axis 3 instead around the axis 4. By obeying this rule the ring becomes the ability to be axially moved together with a shaft into a bore in a body as shown in FIG. 22.

FIG. 22 shows an assembly in which the ring of this invention, for example, ring 52 or ring 152, is set onto a shaft 106. A body is provided with a bore 107 on body 108. Bore 107 has the inner diameter 109 and an axial innermost end face 110. The shaft can now be moved in rightward direction in the Figure until the axial end face 111 of the ring of the invention meets the innermost end face 110 of the bore 107. The assembly is then able to carry an axially directed load on the shaft by the end faces 110 and 111. It is important for this assembly that the snap ring is made to the rules of this invention in order to abtain the ability to carry the axial load without departing axially. For that purpose it is important that the fingers 51, 53, 54 are directed substantially normal to the plane 2 which goes through the axes 3 and 4. Because otherwise the fingers would deform, bend, under the load of the pliers because the ring offers due to its radii 6 and 8 together with the eccentricity "e" between the axes 3 and 4 a strong resistance against radial deformation. The mentioned radii and the eccentricity "e" are so dimensioned in accordance with this present invention that the inner face of the ring presses into the shaft and enters into the shaft 112 within the range of plastic deformability of the material whereof the shaft and the ring are made. Two times the radius 108 is now smaller than the inner diameter 109 of the bore. The difference of the diameters "D" and "d" defines the range of the plastic deformability of the ring 52, 152 and the shaft 106.

ANALYSIS OF THE TECHNOLOGY INVOLVED

FIG. 23 shows the equivalent of FIG. 19, however, with all referential numerals eliminated (except 108) and with the insertion of the basic geoemtric values for an estimate of calculation of the properties of the snap ring of the invention.

The ring is loaded from the inside onto its inner face in radial outer direction by an uniform load "q". The biggest radial thickness of the ring is its radially downward directed section on the bottom of the ring and defined by "H". The radial thickness of the roots (or close to the roots) if the fingers is defined by "h". The radius odf the inner face is "r" and the radius of the outer face is "R" while the eccentricity "e" between the concentric and the eccentric axes is known from the outer Figures.

Then the length of the inner face of the pure ring portion is $$L = 2 r_i \pi \quad (1)$$

For a straight bar with an equal uniform load the following equations would apply:

$$\frac{Mbx}{Mbmax} = \frac{Wmax}{Wx} \quad (2)$$

with "Mbx" the moment at, for example the location of "h"; "Mbmax" the moment at location "H", "Wmax" the moment of resistance at location "H" and "Wx" the moment of restance at location, for example, "h". The moment of resistance for a bar of rectangular cross sectional area is $$W = bH^2/6 \quad (3)$$

Then follows:

$$\frac{Px^2/2}{Pl^2/2} = \frac{b\,h^2/6}{b\,H^2/6}, \text{ or: } \frac{x^2}{L^2} = \frac{h^2}{H^2}, \text{ or} \quad (4)$$

$$h = \sqrt{H^2 \frac{h^2}{L^2}} \text{ with } p = ql$$

The deflection of an equal beam under equal load, if freely supported on its ends, is in the middle of the beam:

$$f = \frac{P}{EJ} \frac{5}{384} L^3 \quad (5)$$

wherefrom follows:

$$P = fEJ384/5L^3 \text{ with } p = qL \quad (6)$$

Considering this equation it follows that for equal stress throughout the length of the beam, the thickness of the beam in the direction of the load gives a linear increase over the length from maximum of thickness in the middle and thickness "zero" on the ends.

The snap ring of FIG. 23 may become considered principally as such a beam for a first rough estimation of its properties.

Then in equations (5) and (6) the following values apply:
P=sum of load=qL=q2r$_i$π
f=defelection
E=modulus of elasticity=21,000 Kg/mm for spring steel,
L=2r$_i$π
J=12/bh³

Combining these results for application of equation (5) to the snap ring and setting "H" for the place of the maximal thickness one obtains:

$$f = \frac{P}{EJ} \frac{5}{389} L^3 = \frac{P}{E\frac{bH^3}{12}} \frac{5}{384} (2r_i\pi)^3 = \quad (7)$$

$$\frac{P}{E} \frac{12}{bH^3} \frac{5 \cdot 8 \cdot \pi^3}{384} r_i^3 = f = \frac{P}{E} \frac{12}{bH^3} 3.23 \, r_i^3$$

To obtain uniform stresses throughout the periphery of the ring, the ring would have to thin radially parallel to the peripherial length away from the location of "H" and would have to reach zero at the opposite location, namely on the top of the ring in the medial plane. Since the snap ring of the invention has at the roots of the fingers the radial thickness "h" it would be required to multiply the length with the reciprocate value of H/h, namely with "h/H" to calculate the ring. Since, however, the roots of the fingers are not located exactly in the top portion of the ring, but approximately at 92 percent of the length of a half of a ring (about at 15 degrees from top in FIG. 23), the value "h/H" is to be multiplied with "92/100=0,92" at a first rough estimation. Thus, the length "2rπ" transforms to the equivalent length:

$$L = 2r\pi(0,92)h/H \quad (8)$$

and the deflection "f" then becomes:

$$f = \frac{P}{E} \frac{12}{bH^3} (0.92)^3 \, 3.23 \left(\frac{h}{H}\right)^3 r^3 \quad (9)$$

with "P" therein "P=qb2πr", while the clamping force becomes:

$$\left(\frac{1}{0.92} = 1.09\right) P = EbH^3 \frac{(1.09)^3}{12 \cdot 3.23} \left(\frac{H}{h}\right)^3 f/r^3 \quad (10)$$

or, simplified: $P = EbH^3 \, 0.0334 \left(\frac{H}{h}\right)^3 f/r^3$ \quad (11)

$$q = P/b2r\pi. \quad (12)$$

For a first estimate how much will the snap ring with its inner compress the bar onto which it is set, the circular configuration of the bar may be replaced by a bar of squared cross sectional area. The cross sectional area of the round bar is diameter square multiplied by pi and divided by four, which gives for the bar with diameter=1 the area of pi/4=0.785 which means that the bar with outer diameter 2ri may be replaced by a squared bar of 0.786×2 ri.

Then Hooke's law applied, yields: (force acting diametrically=2 times)

$$\Delta L = \frac{\sigma}{E} L = \text{Hookes Law;} \quad (13)$$

(L = Length)
(σ = stress)

for the discussed ring sigma is replaced by "q" and since the force acts diametrically the result is to be doubled, whereby one obtains:

$$\Delta L = \delta = 2 \frac{q}{E} 2r \cdot 0.785 \quad (14)$$

or: $(4 \cdot 0.785 = \pi) \Delta L = \delta = r\pi q/E$ \quad (15)

with "δ"=the diametric reduction of the diameter of the round bar, whereonto the snap ring is clamped with its inner face of radius "r".

Still missed is the influence of the eccentricity "e" as a dependant on the radial thicknesses "h" and "H" of the ring.

Since it was estimated that the roots with "h" are located about 15 degrees from the top, one obtains:

$$g = 0.92h \quad (16)$$

and, since: R=r+g+e=H+r−e, follows with R=R:

$$r+g+e=H+r-e, \text{ or: } 2e=H+r-r-0.92h$$

and:

$$e = 0.5 \, (H - 0.92h) \quad (17)$$

whereby "R" becomes calculable with R=r+g+e, since "e" is now known.

Calculating an example of a snap ring of FIG. 19 with r=20, H=14, h=7, E=21000, b=10, and f=0.1 (measures mm and Kg), one gets:

$$p = EbH^3 0.0334 (H/h)^3 f/r^3 = 21000 \cdot 10 \cdot 14^3 \cdot 0.0334 (14-/7)^3 0.1/20^3 = 1924 \text{ Kg}$$

q=1924/10·2·20·π=1.53 Kg/mm²
g=0.92·7=6.44 mm
e=0.5(14−6.44)=3.78 mm; and:
R=r+g+e=20+6.44+3.78=30.22 mm and:
δ=rπq/E=20 π1.53/21000=0.0046 mm It is now directly seen that the roots of the fingers (=h) are radially thicker than the distance "e" between the concentric and eccentric axes. Further the influences of the geometric values are now directly readable. For equal inner and outer radii shortening of the eccentricity "e" brings thicker roots (h) and thereby greater P, meaning stronger clamping force of the snap ring. This appears with the third power of the parameters "H" and "H/h".

From the above sample it may appear to be suitable to make the inner diameter of the snap ring by an inner radius r=19.8 mm, if the bar onto which the snap ring shall be clamped, is 20.00 r=40.00 mm diameter. The inner face of the ring may become grinded, since the shaft is likely grinded. To move the snap ring axially over the bar, its inner face should be widened with the tool from 19.8 to 20.1 inner radius r, which would require a three times higher force than the 1924 Kg which were estimated for the 0.1 mm deflection. At freeing the ends of the fingers from the tool, the snap ring will span with about deflection=0.2 mm (minus the reduction of the outer diameter of the bar) or, about with a force P equal to about 2 times of the 1924 Kg. In short: Force of tool to widen the inner diameter of the snap ring enough=about 1924×3=5772 Kg and clamping force on the bar after the tool is removed=about 1924 Kg×2=about 3848 Kg. Grinding the inner diameter of the ring to a smaller diameter will bring still stronger clamping forces. It is now seen that the radially extending fingers of the former art can not withstand such strong forces of widening the snap ring's inner diameter and the configuration of the invention is an important and the decisive means to materialize a snap ring with strong clamping force without a groove in the bar and with an ability to be moved into a bore with a radius of "r+e" around the concentric axis of the snap ring. In the above calculated sample the pins of the Eickmann reference to fasten four rings axially together, the pin would be set close to the roots of the fingers, namely at "h". Since "h" is 7 mm in the sample, the pins might become a diameter of 3 mm. Assuming the pins to be of very strong steel of about 100 kg per squaremillimeter strength, each pin would carry 3×3×pix100/4=707 Kg maximally until it would break. Since 2 pins are there provided, each would be loaded with 5772/2=2881 Kg at the handling of the snap ring by the tool. That shows, that the pins of the Eickmann reference would already be broken at about one fourth of the force of the tool for handling the snap ring.

The above calculations are first estimates and may become improved by later more exact calculations and may become corrected by empiric values which may become obtained by actual measurements in the future.

A somewhat more simple calculation may be obtained as follows:

Considering the radius of the inner face of the snap ring to be "r", the thereto eccentric outer face to be "R", the distence between the centric and eccentric axes be "e" and the radially thickest portion of the snap ring, located in the plane through the mentioned axes to be "H". The length of the inner face will then be:

$$L = 2r\pi \quad (19)$$

and between the moments the following equations would exist:

$$\frac{Mbx}{Mbmax} = \frac{Wmax}{Wx} \quad (20)$$

This equation would then respective to the snap ring read:

$$\frac{p \cdot x^2/2}{p \cdot L^2/2} = \frac{bh_x^2 \cdot 6}{bH^2 \cdot 6} \quad (21)$$

which transforms to:

$$\frac{x^2}{L^2} = \frac{h_x^2}{H^2} \quad (22)$$

and to:

$$h = \sqrt{H^2 \frac{x^2}{L^2}} \quad (23)$$

Therein "x" is the distance from the location of "H". Thereby the thickness "h" for every local distance in peripheral direction is found for the radial thickness requirement of the snap ring. "b" is the axial thickness of the snap ring.

Note that for obtainment of the aims of the invention, the snap ring should compress the diameter of the metallic bar whereonto it is set by at least one tenthousandth of itys diameter. Thereby it obtains the ability to replace the common snap ring of the known art which is set into a lathed groove in the bar to hold against axial displacement.

Whether this condition is obtained, may be checked by equation (15). Important is in this respect that the fingers 51,54,55 are extended normal to the plane 2 through the axes 3 and 4 and further, that the fingers are short. If this conditions are not met, the fingers would break under the required strong opening force. That is especially true if the direction of the fingers is inclined relative to the mentioned face 2.

Considering, for example, tyhe snap ring of the U.S. Pat. No. 2,180,271 of ARRAS, it will be seen that the snap ring with the circular cross sectional area over its entire peripherial length will not obtain equal local clamping forces and its bowed fingers can not manage the strond opening force of the snap ring of the present invention. To make the wire of the ARRAS sanp ring bigger can not overcome the described problems. The same applies to the snap ring of U.S. Pat. No. 2,874,430 of COLDREN. It also applies to the snap ring of U.S. Pat. No. 3,131,444 of MANNING. In the same way it applies to the snap rings of FIGS. 8 and 9 of U.S. Pat. No. 3,213,499 of ZYLSTRA. The same applies also to the snap ring of French Patent No. 1,365,489 of RAPID SA and the same applies also to the snap ring of the British Patent No. 1,560,606 of FORD MOTOR COMPANY.

FIGS. 23 to 26 show the basic geometric concepts for the analysis of the technology which is involved in the snap ring of this present invention. FIG. 23 defines the radii "r" and "R", the radial thicknesses "H" and "h" with "H" the maximal radial thickness appearing the the plane 2 through the axes 3 and 4. es well as the imaginary thickness "g", the eccentricty "e" and the uniform load "q" along the inner face of the snap ring.

FIG. 24 illustrates the deflection "f" of a bar at length "L" under the unform load "q".

FIG. 25 illustrates the thickness of the bar of FIGS. 24 which would bring equal stress throughout the beam under the uniform load of FIG. 24.

FIG. 26 explains the relationship of a circle to an equal area of a square.

Since the hereafter appended claims describe the invention and its embodiments partially more in detail, the claims are considered to be also a portion of the description of the preferred embodiments of the invention.

What is claimed is:

1. A ring having an imaginary medial plane with a medial axis therein normal to and through said medial plane, wherein an inner face is formed with a first radius around said medial axis to border an inner space in said ring, wherein one end of said ring forms an inner finger and the other end of said ring forms at least two outer fingers while a slot is provided between said outer fingers, said inner finger is extended through said slot with the bottom of said slot close to said inner finger and substantially parallel to the bottom of said inner finger, wherein said fingers extend at least slightly beyond the outer face of said ring to form ends on said fingers and to permit the use of a tool on said ends to press said ends towards each other, whereby said inner face of said ring widens at least slightly in radial direction and said ring compresses automatically under own force of spring-action to its original size of its inner face, when said ends of said fingers are not pressed towards each other;

wherein a second axis imagined through said medial plane is distanced from said medial axis to constitute an eccentric axis, while the outer face of said ring is partially formed by a second radius around said second axis; whereby the radial thickness of said ring reduces proportionate with the peripheral distances from its biggest, its medial portion "H", wherein said fingers are provided on their roots where they extend from said rings with radially relative to said outer face of said ring outwardly inclined necks while said fingers extend from said roots to said ends of said fingers in a direction which is substantially normal to the direction of said medial plane, and, wherein the biggest radial thickness of said ring exceeds one fourth of of the length of said first radius of said inner face.

2. The ring of claim 1,
wherein said ring is made of a single body of metal.

3. The ring of claim 1,
wherein said fingers extend substantially parallel to each other in opposed directions with said outer fingers partially facing portions of said inner fingers.

4. The ring of claim 1,
wherein said fingers form a direction of parallelity, and,
wherein said direction of parallelity is substantially normal relative to said medial plane of said ring.

5. The ring of claim 1,
wherein said ends of said fingers form a first distance between said ends of said fingers with said ends of said fingers formed substantially parallel to said imaginary medial plane of said ring,
while said first distance forms a ratio relative to the biggest diameter of said outer face which corresponds to twice the length of said second radius; and;
wherein said ratio is substantially 0.62 to 0.98.

6. The ring of claim 1,
wherein said fingers remain inside of a circle which can be formed by a third radius around said second axis when said third radius has a length which corresponds to the sum of said second radius plus the distance between said first and second axes.

7. The ring of claim 1,
wherein said ring is provided by a medial ring and two outer rings with said outer rings fixed laterally to said medial ring whereby each end of said medial ring is flanked by a respective ring of said outer rings.

8. The ring of claim 7,
wherein said medial ring is at least ten percent thicker than each individual ring of said outer rings.

9. The ring of claim 7,
wherein said inner ring has a first thickness,
wherein each single outer ring of said outer rings has a second thickness,
wherein said thicknesses define a ratio of said first thickness relative to said second thickness, and,
wherein said ratio of said first thickness to said second thickness is about 1.2 to 1.8.

10. A one piece ring having an imaginary medial plane with a first and concentric axis therein and through said medial plane,
wherein an inner face is formed by a first radius around said first axis in said medial plane to border an inner hole in said ring,
wherein a second axis which constitutes an eccentric axis is parallel distanced from said first axis in said plane and said ring has an outer face at least partially with a second radius around said second axis,
wherein said second radius exceeds the size of said first radius by at least 11 percent and said distance between said first and second axes exceeds ten percent of the size of said first radius;
wherein one end of said ring forms an inner finger and the other end of said ring forms at least two outer fingers, while a slot is provided between said outer fingers to receive in said slot a portion of said inner finger, whereby said inner finger extends through said slot with said fingers extending substantially normal to said medial plane; and; wherein said fingers extend at least slightly beyond the outer face of said ring to form ends on said fingers and to permit to use a means on said ends to press said ends towards each other, whereby the diameter of said inner face of said ring widens at least slightly in radial direction when said ends are pressed towards each other and said ring compresses automatically under own force of spring action to its original diameter of its inner face, when said ends of said fingers are not pressed towards each other.

11. The ring of claim 10,
wherein said inner face is provided with cornered extensions into said ring to form a cornered inner face with said inner face substantially complementary to to a respective bar with noncircular cornered cross-sectional area.

12. A partially radially slotted snap ring of partially symmetric configuration about an imaginary medial plane with a medial axis in and through said medial plane, wherein an inner face is formed around said medial axis to border the radial inside of said ring, wherein the peripherial ends of said ring form roots for the provision and extension of fingers, one peripheral end of said ring forms an inner finger and the other peripherial end of said ring forms at least two outer fingers, while a slot is provided between said outer fingers with said inner finger extending through said slot, wherein the bottom of said slot is located close to said inner finger and substantially parallel to the bottom of said inner finger while the bottom of said slot is distanced from said medial plane and directed substantially normal to said medial plane, wherein said fingers extend at least slightly radially outwards beyond the outer diameter of said ring to form ends of said fingers with said ends substantially plane to form reception faces for the setting of a tool onto said reception faces to press said ends towards each other for effecting that the diameter of said inner face widens at least slightly in radial direction, while said ring compresses automatically under own force of spring action to its original size of the diameter of said inner face when said ends of said fingers are not pressed towards each other, wherein a second axis imagined through said medial plane is distanced from said medial axis to constitute an eccentric axis, while the outer face of said ring is partially formed by a second radius around said eccentric axis, wherein said ring is made from a single body of material, and, wherein said fingers extend from said roots to said ends of said fingers in a direction which is substantially normal to the direction of said medial plane, while said reception faces which form the ends of said fingers are directed substantially parallel to said medial plane.

13. The ring of claim 12, wherein said roots are radially bigger than the length of the distance between said medial and said eccentric axes.

14. The ring of claim 1, wherein the circularity of said inner face is interrupted by diametrically of each other located and relative to each other inclined straight faces which meet in corners to form a cornered face of a multi sided polygonal configuration.

15. A ring having an imaginary medial plane with a medial axis therein normal to and through said medial plane, wherein an inner face is formed with a first radius around said medial axis to border an inner space in said ring, wherein one end of said ring forms an inner finger and the other end of said ring forms at least two outer fingers while a slot is provided between said outer fingers, said inner finger is extended through said slot with the bottom of said slot close to said inner finger and substantially parallel to the bottom of said inner finger, wherein said fingers extend at least slightly beyond the outer face of said ring to form ends on said fingers and to permit the use of a tool on said ends to press said ends towards each other, whereby said inner face of said ring widens at least slightly in radial direction and said ring compresses automatically under own force of spring-action to its original size of its inner face, when said ends of said fingers are not pressed towards each other;

wherein a second axis imagined through said medial plane is distanced from said medial axis to constitute an eccentric axis, while the outer face of said ring is partially formed by a second radius around said second axis; whereby the radial thickness of said ring reduces proportionate with the peripherial distances from its biggest, its medial portion "H", wherein said fingers are provided on their roots where they extend from said rings with radially relative to said outer face of said ring outwardly inclined necks while said fingers extend from said roots to said ends of said fingers in a direction which is substantially normal to the direction of said medial plane, wherein the biggest radial thickness of said ring exceeds one fourth of the length of said first radius of said inner face wherein said ring is made of a single body of metal, wherein said fingers extend substantially parallel to each other in opposed directions with said outer fingers partially facing portions of said inner fingers, wherein said fingers form a parallel direction, and, wherein said parallel direction is substantially normal relative to said medial plane of said ring.

16. The ring of claim 15, wherein said ends of said fingers form a first distance between said ends of said fingers with said ends of said fingers formed substantially parallel to said imaginary medial plane of said ring, while said first distance forms a ratio relative to the biggest diameter of said outer face which corresponds to twice the length of said second radius; and;

wherein said ratio is substantially 0.62 to 0.98.

17. The ring of claim 15, wherein the circularity of said inner face is interrupted by diametrically of each other located and relative to each other inclined straight faces which meet in corners to form a cornered face of a multi sided polygonal configuration.

18. The ring of claim 15, wherein said fingers remain inside of a circle which can be formed by a third radius around said second axis when said third radius has a length which corresponds to the sum of said second radius plus the distance between said first and second axes.

19. A ring having an imaginary medial plane with a medial axis therein normal to and through said medial plane, wherein an inner face is formed with a first radius around said medial axis to border an inner space in said ring, wherein one end of said ring forms an inner finger and the other end of said ring forms at least two outer fingers while a slot is provided between said outer fingers, said inner finger is extended through said slot with the bottom of said slot close to said inner finger and substantially parallel to the bottom of said inner finger, wherein said fingers extend at least slightly beyond the outer face of said ring to form ends on said fingers and to permit the use of a tool on said ends to press said ends towards each other, whereby said inner face of said ring widens at least slightly in radial direction and said ring compresses automatically under own force of spring-action to its original size of its inner face, when said ends of said fingers are not pressed towards each other;

wherein a second axis imagined through said medial plane is distanced from said medial axis to constitute an eccentric axis, while the outer face of said ring is partially formed by a second radius around said second axis; whereby the radial thickness of said ring reduces proportionate with the peripherial distances from its biggest, its medial portion "H", wherein said fingers are provided on their roots where they extend from said rings with radially relative to said outer face of said ring outwardly inclined necks while said fingers extend from said roots to said ends of said fingers in a direction which is substantially normal to the direction of said medial plane, wherein the biggest radial thickness of said ring exceeds one fourth of of the length of said first radius of said inner face,
wherein said ring is provided by a medial ring and two outer rings with said outer rings fixed laterally to said medial ring whereby each end of said medial ring is flanked by a respective ring of said outer rings, and,
wherein said medial ring is at least ten percent thicker than each individual ring of said outer rings.

20. The ring of claim 19,
wherein said inner ring has a first thickness,
wherein each single outer ring of said outer rings has a second thickness,
wherein said thicknesses define a ratio of said first thickness relative to said second thickness, and,
wherein said ratio of said first thickness to said second thickness is about 1.2 to 1.8.

* * * * *